United States Patent
Kim et al.

(10) Patent No.: US 8,213,531 B2
(45) Date of Patent: Jul. 3, 2012

(54) APPARATUS FOR TRANSMITTING SIGNAL IN SEMICONDUCTOR INTEGRATED CIRCUIT

(75) Inventors: Hyung Soo Kim, Ichon (KR); Kun Woo Park, Ichon (KR); Yong Ju Kim, Ichon (KR); Jong Woon Kim, Ichon (KR); Hee Woong Song, Ichon (KR); Ic Su Oh, Ichon (KR); Tae Jin Hwang, Ichon (KR)

(73) Assignee: SK hynix, Inc. (KR)

( * ) Notice: Subject to any disclaimer, the term of this patent is extended or adjusted under 35 U.S.C. 154(b) by 1221 days.

(21) Appl. No.: 11/966,250

(22) Filed: Dec. 28, 2007

(65) Prior Publication Data

US 2009/0041154 A1 Feb. 12, 2009

(30) Foreign Application Priority Data

Aug. 10, 2007 (KR) .................. 10-2007-0080512

(51) Int. Cl.
*H04L 25/34* (2006.01)

(52) U.S. Cl. ........ 375/286; 375/232; 375/288; 375/340; 375/355

(58) Field of Classification Search ............. 375/286, 375/293, 232, 288, 340, 355; 380/43, 212, 380/268; 327/336; 330/261
See application file for complete search history.

(56) References Cited

U.S. PATENT DOCUMENTS

| 7,089,465 | B2 | 8/2006 | Lee | |
|---|---|---|---|---|
| 7,380,993 | B2 * | 6/2008 | Dallesasse | 385/89 |
| 7,912,215 | B2 * | 3/2011 | Furusawa et al. | 380/43 |
| 2002/0075968 | A1 * | 6/2002 | Zerbe et al. | 375/286 |
| 2005/0268167 | A1 | 12/2005 | Huott et al. | |
| 2009/0033422 | A1 * | 2/2009 | An et al. | 330/261 |

FOREIGN PATENT DOCUMENTS

| JP | 2005322375 | | 11/2005 |
|---|---|---|---|
| JP | 2007-012241 | | 1/2007 |
| KR | 1020020077642 | A | 10/2002 |
| KR | 100465834 | | 12/2004 |
| KR | 1020070060823 | A | 6/2007 |

* cited by examiner

*Primary Examiner* — Dhaval Patel

(74) *Attorney, Agent, or Firm* — Baker & McKenzie LLP

(57) ABSTRACT

An apparatus for transmitting a signal in a semiconductor integrated circuit includes a multilevel transmission control block that outputs a plurality of bits of an input signal in serial or parallel according to whether a multilevel transmission operation is performed or not, and a signal processing block that selectively performs the multilevel transmission operation according to a form of the input signal, which are output in serial or parallel from the multilevel transmission control block.

22 Claims, 7 Drawing Sheets

APPARATUS FOR TRANSMITTING SIGNAL IN SEMICONDUCTOR INTEGRATED CIRCUIT

CROSS-REFERENCE TO RELATED PATENT APPLICATION

This application claims the benefit under 35 U.S.C 119(a) of Korean Patent Application No. 10-2007-0080512, filed on Aug. 10, 2007, in the Korean Intellectual Property Office, the disclosure of which is incorporated herein in its entirety by reference as if set forth in full.

BACKGROUND

1. Technical Field

The embodiments described herein relate to an apparatus for transmitting a signal in a semiconductor integrated circuit, and more particularly, to an apparatus for transmitting a signal in a semiconductor integrated circuit that is capable of adjusting a multilevel transmission operation, an operation speed, and a swing level of an output signal.

2. Related Art

In recent years, the operation speed, integration level, and capacity have been increasing for conventional semiconductor integrated circuits. In order to achieve these advances in conventional semiconductor integrated circuits, a variety of new technologies have been used. For example, a multilevel transmission technology is widely used as an information transmission technology. In a multilevel transmitting apparatus, information of a plurality of bits may be transmitted via a single transmission bit. The information that is transmitted using a plurality of bits is decoded from the single transmission bit, which can be transmitted at any signal level.

That is, unlike traditional data transmission schemes where a single bit represent one of two discrete signal levels including a high level and a low level, in a multilevel transmission system, a plurality of signal levels, for example, four levels are included in data of one bit, and then the data is transmitted. Accordingly, multilevel transmission systems can achieve an improved information transmission speed.

Further, the operation speed of a semiconductor integrated circuit can be improved by implementing a technology that utilizes a high frequency clock. However, the use of a high frequency increases power consumption in the semiconductor integrated circuit.

In general, a semiconductor integrated circuit includes a signal transmitting apparatus and transmits an output signal through an external channel. At this time, as described above, if the operation speed of the signal transmitting apparatus is increased, it becomes difficult to decrease power consumption. If power consumption is decreased, it becomes difficult to increase the operation speed of the signal transmitting apparatus. Preferably, the signal transmitting apparatus selectively performs operations at a high speed or with low power according to required conditions in the signal transmitting apparatus. However, it is difficult to achieve a signal transmitting apparatus that can selectively adjust to the predetermined conditions according to given situations.

SUMMARY

An apparatus for transmitting a signal in a semiconductor integrated circuit that is capable of adjusting a multilevel transmission operation, an operation speed, and a swing level of an output signal is described herein.

According to one aspect, an apparatus for transmitting a signal in a semiconductor integrated circuit includes a multilevel transmission control block that outputs a plurality of bits of an input signal in serial or parallel according to whether a multilevel transmission operation is performed or not, and a signal processing block that selectively performs the multilevel transmission operation according to a form of the input signal, which is output in serial or parallel from the multilevel transmission control block.

According to another aspect, an apparatus for transmitting a signal in a semiconductor integrated circuit includes a first signal line, a second signal line, an output node, a multilevel transmission control block that outputs a plurality of bits of an input signal to the first signal line or the second signal line according to whether a multilevel transmission operation is performed or not, a first signal processing unit that controls a voltage at the output node according to a signal transmitted through the first signal line, a second signal processing unit that controls the voltage at the output node according to a signal transmitted through the second signal line, and a speed control unit that controls an output speed of a signal output from the output node in response to a speed control signal.

According to still another embodiment, an apparatus for transmitting a signal in a semiconductor integrated circuit includes a control signal generating block that generates a speed control signal and a swing level control signal, a signal processing unit that controls voltage levels of an output signal according to an input signal, a speed control unit that controls an output speed of the output signal in response to the speed control signal, and a swing level control unit that controls a swing level of the output signal in response to the swing level control signal.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
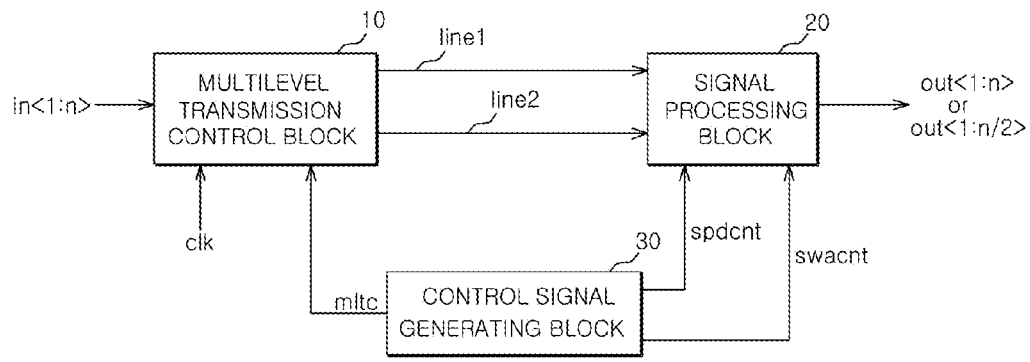
FIG. 1 is a block diagram illustrating an apparatus for transmitting a signal in a semiconductor integrated circuit according to one embodiment.

Referring to FIG. 1, it can be seen that an apparatus for transmitting a signal (hereinafter, referred to as signal transmitting apparatus) in a semiconductor integrated circuit according to an embodiment can include a multilevel transmission control block 10, a signal processing block 20, and a control signal generating block 30.

The multilevel transmission control block 10 can be configured to output n-bits of an input signal 'in<1:n>' in series or parallel according to whether a multilevel transmission control signal 'mltc' is enabled or not. The multilevel transmission control block 10 and the signal processing block 20 can be connected by a first signal line line1 and a second signal line line2. When the multilevel transmission control signal 'mltc' is disabled, the multilevel transmission control block 10 can be configured to output the n-bits of the input signal 'in<1:n>' through the first signal line line1. When the multilevel transmission control signal 'mltc' is enabled, the multilevel transmission control block 10 can be configured to equally distribute the n-bits of the input signal 'in<1:n>' to the first signal line line1 and the second signal line line2. The multilevel transmission control block 10 can be configured to perform the above-described operation according to the control of a clock 'clk'. The clock 'clk' can be transmitted from a PLL (Phase Locked Loop) circuit.

When the multilevel transmission control block 10 transmits the n-bits of the input signal 'in<1:n>' using only the first signal line line1, the signal processing block 20 can be configured to drive the n-bits of the input signal and output n-bits of an output signal 'out<1:n>'. At this time, in the n-bits of the output signal 'out<1:n>', two pieces of information, that is, 0 or 1 is stored for each bit. Meanwhile, when the multilevel transmission control block 10 distributes and transmits the n-bits of the input signal 'in<1:n>' using the first signal line line1 and the second signal line line2, the signal processing block 20 can be configured to drive one bit of the signal, which is transmitted through the first signal line line1, and one bit of the signal, which is transmitted through the second signal line line2. Then, the signal processing unit 20 can be configured to repeat the driving operation and output the n/2 bits of the output signal 'out<1:n/2>'. At this time, in the n/2 bits of the output signal 'out<1:n/2>' each bit may store four pieces of information.

Like this, in accordance with whether the multilevel transmission control signal 'mltc' is enabled or not, the multilevel transmission control block 10 and the signal processing block 20 can selectively perform a multilevel transmission operation. The multilevel transmission control signal 'mltc' can be enabled on the basis of the environment of where the signal transmitting apparatus is disposed.

Further, the signal processing block 20 can be configured to control an output speed of the n-bits or n/2-bits of the output signal 'out<1:n>' or 'out<1:n/2>' in response to a speed control signal 'spdcnt'. The output speed of the output signal can be determined according to a frequency of the clock 'clk'. However, if the signal processing block 20 minutely changes the operation on the basis of environment of where the signal transmitting apparatus is disposed and the consequent conditions, an efficient output speed can be obtained. The signal processing block 20 can control a swing level of the n-bits or n/2-bits of the output signal 'out<1:n>'or ' out<1:n/2>' in accordance with the control of a swing level control signal 'swacnt'. In this manner, the signal processing block 20 can control the output speed or the swing level of the output signal.

In order to control the above-described operation, the signal transmitting apparatus can include the control signal generating block 30. The control signal generating block 30 can be configured to generate the multilevel transmission control signal 'mltc', the speed control signal 'spdcnt', and the swing level control signal 'swacnt'. The operation of the apparatus can be tested in light of the surrounding conditions and changes in the multilevel transmission control signal 'mltc', the speed control signal 'spdcnt', and the swing level control signal 'swacnt', to allow selection of the form, output speed, and swing level of the output signals. That is, the value of a control signal, which is generated by the control signal generating block 30, can be selected and a function of the signal transmitting apparatus can be determined.

Figure 2:
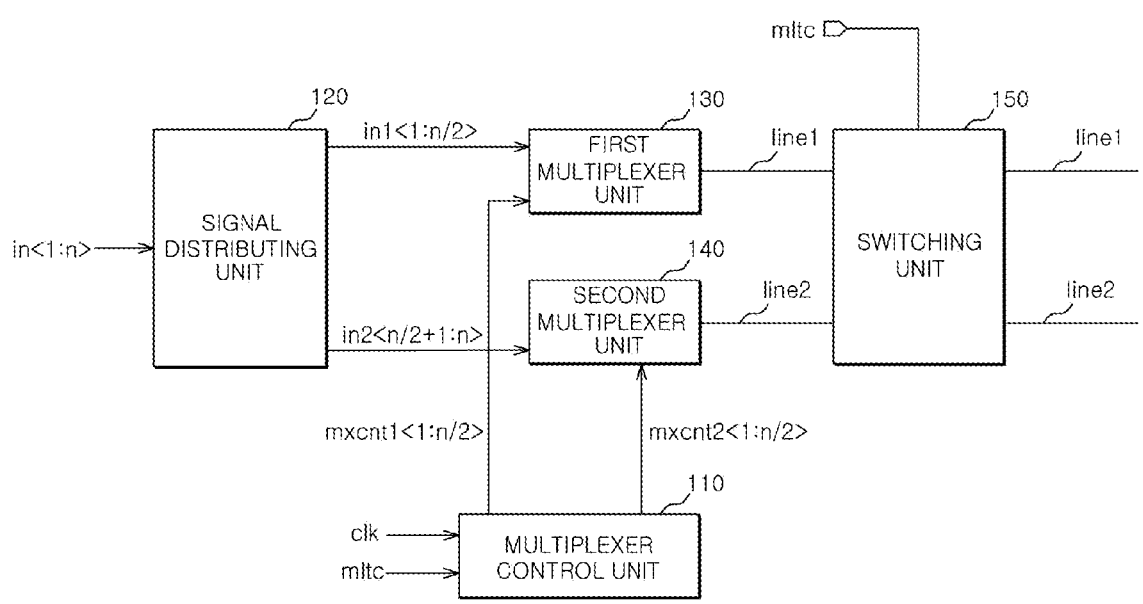
FIG. 2 is a diagram illustrating a detailed structure of a multilevel transmission control block that can be included in the apparatus shown in FIG. 1.

Referring to FIG. 2, the multilevel transmission control block 10 can include a multiplexer control unit 110, a signal distributing unit 120, a first multiplexer unit 130, a second multiplexer unit 140, and a switching unit 150.

The multiplexer control unit 110 can be configured to generate n/2-bits of a first multiplexer control signal 'mxcnt1<1:n/2>' and n/2-bits of a second multiplexer control signal 'mxcnt2<1:n/2>' in response to the clock 'clk' and the multilevel transmission control signal 'mltc'. That is, the multiplexer control unit 110 can be configured to generate the n/2-bits of the first multiplexer control signal 'mxcnt1<1:n/2>' and the n/2-bits of the second multiplexer control signal 'mxcnt2<n/2+1:n>' in synchronization with a toggle timing of the clock 'clk'. At this time, when the multilevel transmission control signal 'mltc' is disabled, the first multiplexer control signal 'mxcnt1<1:n/2>' is sequentially enabled in a bit unit, and the second multiplexer control signal 'mxcnt2<n/2+1:n>' is sequentially enabled in a bit unit. When the multilevel transmission control signal 'mltc' is enabled, the first multiplexer control signal 'mxcnt1<1:n/2>' and the second multiplexer control signal 'mxcnt2<n/2+1:n>' can be are alternately enabled in a bit unit.

The signal distributing unit 120 can be configured to latch the n-bits of the input signal 'in<1:n>' in a bit unit and output the n/2-bits of the first input signal 'in1<1:n/2>' and the n/2-bits of the second input signal 'in2<n/2+1:n>'. The first multiplexer unit 130 can sequentially output the first input signal 'in1<1:n/2>' to the first signal line line1 in response to the first multiplexer control signal 'mxcnt1<1:n/2>'. The second multiplexer unit 140 can be configured to sequentially output the second input signal 'in2<n/2+1:n>' to the second signal line line2 in response to the second multiplexer control signal 'mxcnt2<1:n/2>'.

In response to the multilevel transmission control signal 'mltc', the switching unit 150 can be configured to determine whether the first signal line line1 and the second signal line line2 are connected or not and whether the second signal line line2 is short-circuited or not. That is, when the multilevel transmission control signal 'mltc' is disabled, the switching unit 150 can be configured to connect the first signal line line1 and the second signal line line2, and open-circuit the second signal line line2.

Accordingly, the signals, which are output from the second multiplexer unit 140 to the second signal line line2, can be input to the signal processing block 20 through the first signal line line1. Meanwhile, when the multilevel transmission control signal 'mltc' is enabled, the switching unit 150 can be configured to stop the connection between the first signal line line1 and the second signal line line2, and short-circuit the second signal line line2. Therefore, the signals, which are output from the second multiplexer unit 140, can be input to the signal processing block 20 through the second signal line line2.

Figure 3:
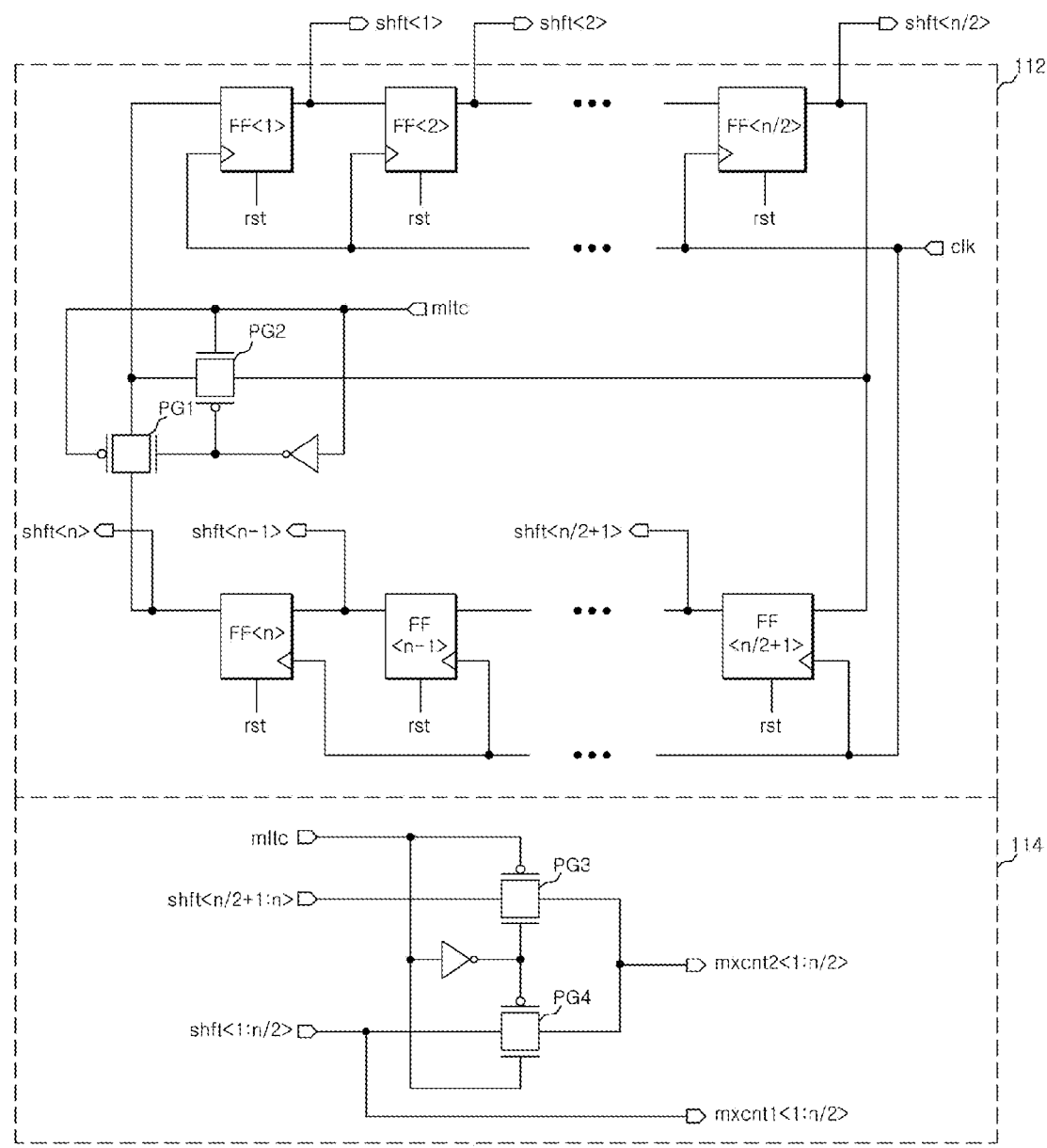
FIG. 3 is a diagram illustrating a detailed structure of a multiplexer control unit that can be included in the control block shown in FIG. 2.

Referring to FIG. 3, the multiplexer control unit 110 can include a shifting section 112 and a signal output section 114.

The shifting section 112 can be configured to generate n-bits of a shift signal 'shft<1:n>' in response to the multilevel transmission control signal 'mltc', the clock 'clk', and a reset signal 'rst'. The shifting section 112 can include n flip-flops FF<1:n>, each of which is reset by the reset signal 'rst', latches an output signal of a previous flip-flop FF<i−1> according to the control of the clock 'clk', and outputs a bit of the shift signal 'shft<i>'.

The n flip-flops FF<1:n> can be disposed in a feedback loop type. The shift signal 'shft<n>', which is output from the n-th flip-flop FF<n> among the n flip-flops FF<1:n>, can be input to a signal input terminal of the first flip-flop FF<1> through a first pass gate PG1, which can be turned on when the multilevel transmission control signal 'mltc' is disabled. The shift signal 'shft<n/2>' which is output from the (n/2)-th flip-flop FF<n/2> among the n flip-flops FF<1:n>, can be input to the signal input terminal of the first flip-flop FF<1> through a second pass gate PG2, which can be turned on when the multilevel transmission control signal 'mltc' is enabled. Meanwhile, among the n flip-flops FF<1:n>, the first flip-flop FF<1> should be implemented to output a high-level signal when the reset signal 'rst' is enabled. The other flip-flops FF<2:n> should be implemented to output a low-level signal when the reset signal 'rst' is enabled.

In response to the multilevel transmission control signal 'mltc', the signal output section 114 can be configured to output the first multiplexer control signal 'mxcnt1<1:n/2>' and the second multiplexer control signal 'mxcnt2<1:n/2>' from the n-bits of the shift signal 'shft<1:n>'. The signal output section 114 can include a third pass gate PG3 and a fourth pass gate PG4.

When the multilevel transmission control signal 'mltc' is disabled, the third pass gate PG3 can be configured to output the (n/2+1)-th to n-th bits of the shift signal 'shft<n/2+1:n>' as the second multiplexer control signal 'mxcnt2<1:n/2>'. When the multilevel transmission control signal 'mltc' is enabled, the fourth pass gate PG4 can be configured to output the first to (n/2)-th bits of the shift signal 'shft<1:n/2>' the second multiplexer control signal 'mxcnt2<1:n/2>'. At this time, the first multiplexer control signal 'mxcnt1<1:n/2>' should be implemented by the first to (n/2)-th bits of the shift signal 'shft<1:n/2>'.

In the above-described structure, the multiplexer control unit 112 can be configured to sequentially enable the first to n-th bits of the shift signal 'shft<1:n>'. At this time, when the multilevel transmission control signal 'mltc' is disabled, the first pass gate PG1 and the third pass gate PG3 can be turned on. Accordingly, the first to (n/2)-th bits of the shift signal 'shft<1:n/2>' can be sequentially output as the first multiplexer control signal 'mxcnt1<1:n/2>' and then the (n/2+1)-th to n-th bits of the shift signal 'shft<n/2+1:n>' can be sequentially output as the second multiplexer control signal 'mxcnt2<1:n/2>'. Accordingly, after n/2-bits of the first multiplexer control signal 'mxcnt1<1:n/2>' are sequentially enabled, n/2-bits of the second multiplexer control signal 'mxcnt2<1:n/2>' can be sequentially enabled.

Meanwhile, when the multilevel transmission control signal 'mltc' is enabled, the second pass gate PG2 and the fourth pass gate PG4 can be turned on. Accordingly, the (n/2+1)-th to n-th bits of the shift signal 'shft<n/2+1:n>' can be sequentially output as the first multiplexer control signal 'mxcnt1<1: n/2>', and the (n/2+1)-th to n-th bits of the shift signal 'shft<n/2+1:n>' can be sequentially output as the second multiplexer control signal 'mxcnt2<1:n/2>'. Accordingly, n/2-bits of the first multiplexer control signal 'mxcnt1<1:n/2>' and n/2-bits of the second multiplexer control signal 'mxcnt2<1:n/2>' can be sequentially enabled at the same time.

Figure 4:
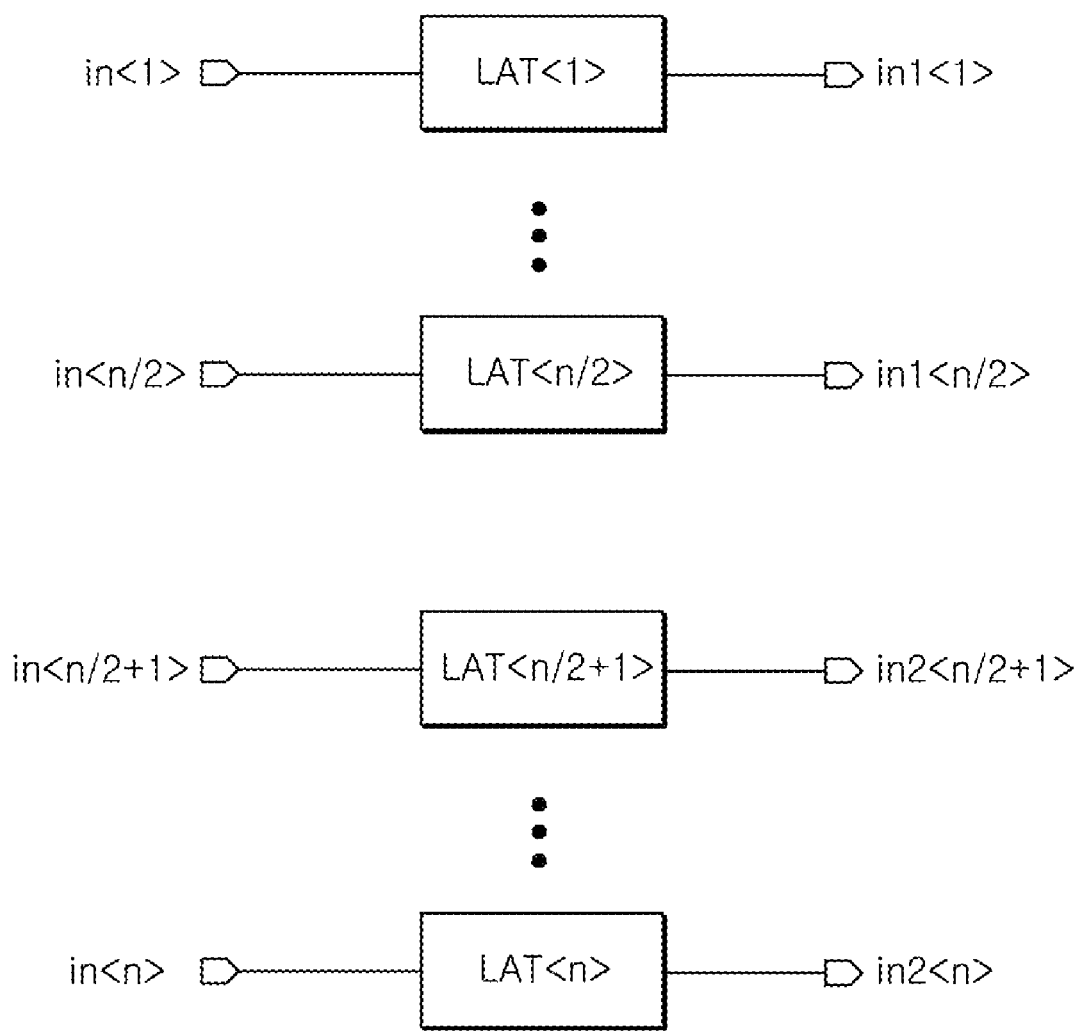
FIG. 4 is a diagram illustrating a detailed structure of a signal distributing unit that can be included in the control block shown in FIG. 2.

Referring to FIG. 4, the signal distributing unit 120 can include n latches LAT<1:n> that latch the n-bits of the input signal 'in<1:n>' in a bit unit and output the n/2-bits of the first input signal 'in1<1:n/2>' and the n/2-bits of the second input signal 'in2<n/2+1:n>'.

Figure 5A:
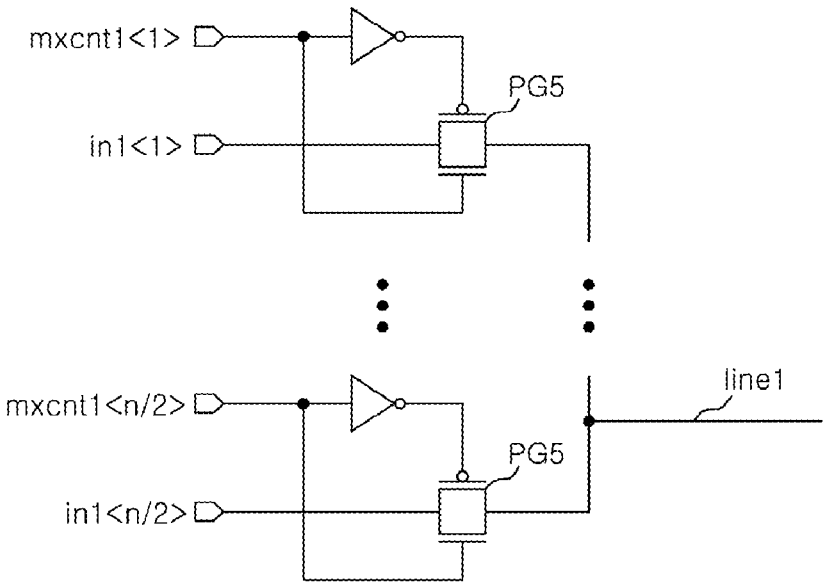
FIG. 5A is a diagram illustrating a detailed structure of a first multiplexer unit that can be included in the control block shown in FIG. 2.

Referring to FIG. 5A, the first multiplexer unit 130 includes n/2 fifth pass gates PG5<1:n/2> that can be configured to output individual bits of the first input signal 'in1<1: n/2>' to the first signal line line1 in response to the individual bits of the first multiplexer control signal 'mxcnt1<1:n/2>'.

Figure 5B:
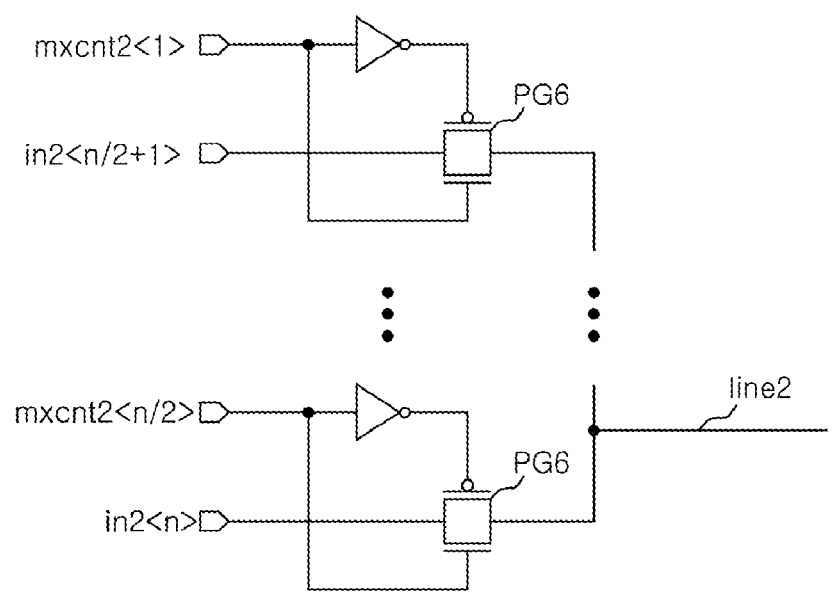
FIG. 5B is a diagram illustrating a detailed structure of a second multiplexer unit that can be included in the control block shown in FIG. 2.

Referring to FIG. 5B, the second multiplexer unit 140 can include n/2 sixth pass gates PG6<1:n/2> that can be configured to output individual bits of the second input signal 'in2<2+1:n>' to the second signal line line2 in response to the individual bits of the second multiplexer control signal 'mxcnt2<1:n/2>'.

Figure 6:
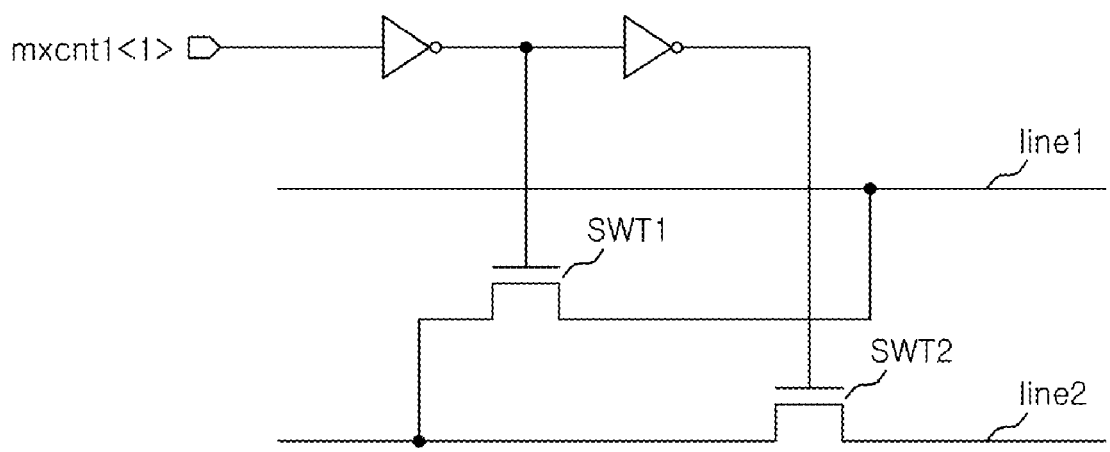
FIG. 6 is a diagram illustrating a detailed structure of a switching unit that can be included in the control block shown in FIG. 2.

Referring to FIG. 6, the switching unit 150 can include a first switching element SWT1 and a second switching element SWT2.

The first switching element SWT1 i can be provided between the first signal line line1 and the second signal line line2 and can be controlled by the multilevel transmission control signal 'mltc'. The second switching element SWT2 can be provided on the second signal line line2 and is controlled by the multilevel transmission control signal 'mltc'.

When the multilevel transmission control signal 'mltc' is disabled, the second signal line line2 opens, and the first signal line line1 and the second signal line line2 can be connected to each other. Thus, the signals, which are output from the second multiplexer unit 140 to the second signal line line2, can be transmitted to the signal processing block 20 through the first signal line line1. In contrast, when the multilevel transmission control signal 'mltc' is enabled, the connection of the first signal line line1 and the second signal line line2 can be stopped, and the second signal line line2 can be short-circuited. Thus, the first signal line line1 and the second signal line line2 can transmit the corresponding signals to the signal processing block 20.

Figure 7:
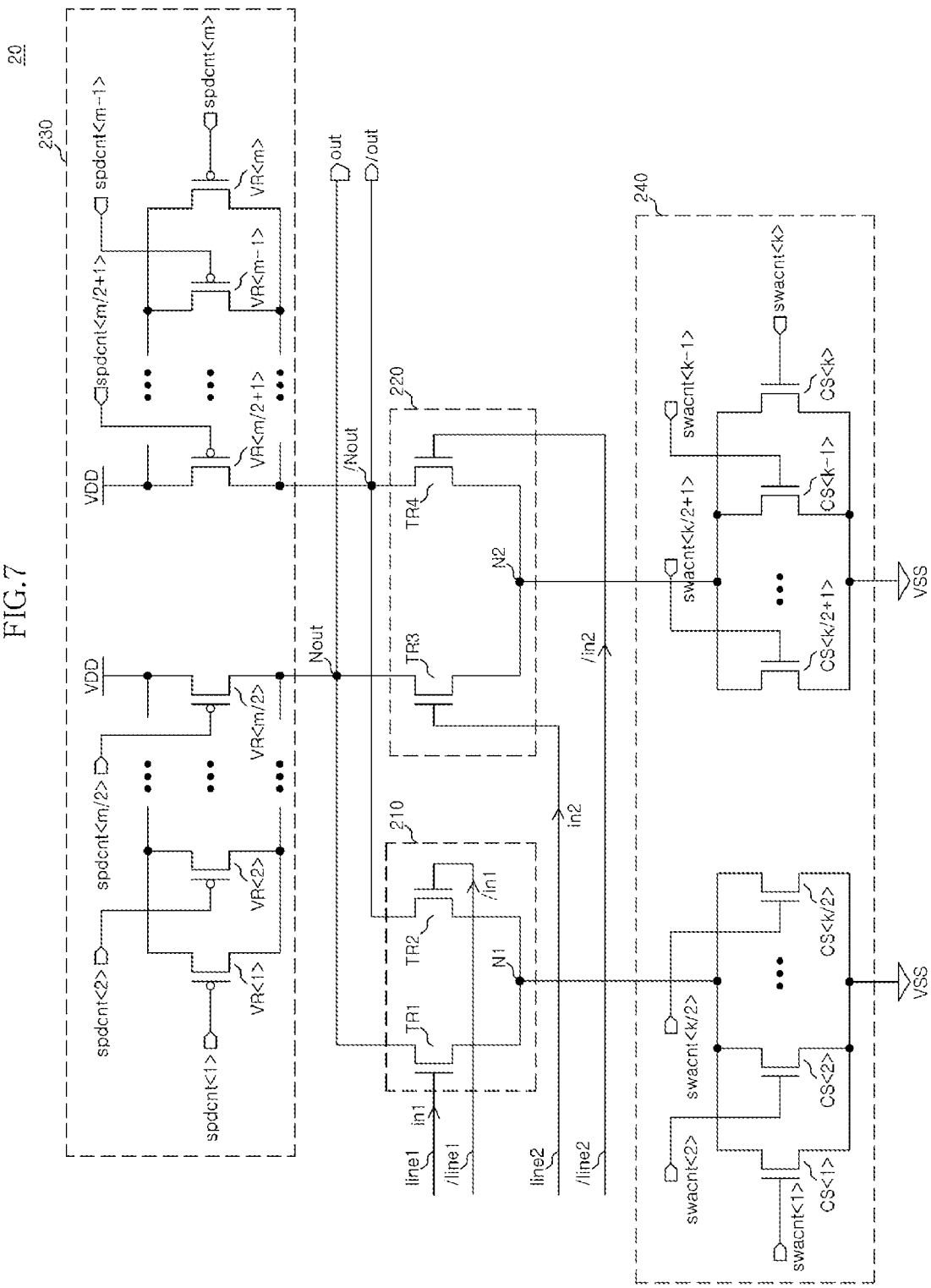
FIG. 7 is a diagram illustrating a detailed structure of a signal processing block that can be included in the apparatus shown in FIG. 1.

FIG. 7 is a diagram illustrating a detailed structure of a signal processing block shown in FIG. 1. In the example of FIG. 7, each of an input signal and an output signal is implemented as a signal pair. Accordingly, the first signal line line1 is represented as a first signal line pair line1 and /line1, and the second signal line line2 is represented as a second signal line pair line2 and /line2.

As shown in FIG. 7, the signal processing block 20 can include a first signal processing unit 210, a second signal processing unit 220, a speed control unit 230, and a swing level control unit 240.

The first signal processing unit 210 can be configured to control voltages at an output node pair Nout and /Nout according to signals (hereinafter, referred to as first input signal pair 'in1' and '/in1') input through the first signal line pair 'line ' and '/line1'. The first signal processing unit 210 includes a first transistor TR1 and a second transistor TR2.

The first transistor TR1 can be provided between the positive output node Nout and a first node N1, and can have a gate that receives the positive first input signal 'in1'. The second transistor TR2 can be provided between the negative output node /Nout and the first node N1, and has a gate that receives the negative first input signal '/in1'.

The second signal processing unit 220 can be configured to control voltages at the output node pair Nout and /Nout according to signals (hereinafter, referred to as second input signal pair 'in2' and '/in2') input through the second signal line pair 'line2' and '/line2'. The second signal processing unit 220 includes a third transistor TR3 and a fourth transistor TR4.

The third transistor TR3 is provided between the positive output node Nout and a second node N2, and can have a gate that receives the positive second input signal 'in2'. The fourth transistor TR4 can be provided between the negative output node /Nout and the second node N2, and can have a gate that receives the negative second input signal '/in2'.

In response to the speed control signal 'spdcnt', the speed control unit 230 can be configured to control an output speed of the output signal pair 'out' and '/out' that is output from the output node pair Nout and /Nout. The speed control signal 'spdcnt' can be implemented by combining m signals. The speed control unit 230 can include m variable resistor elements VR<1:m>. Each of m/2 variable resistor elements VR<1: m/2> can be provided between a power supply terminal and the positive output node Nout and can be controlled by a bit of speed control signal 'spdcnt<i>'. Each of m/2 variable resistor elements VR<m/2+1:m> can be provided between the power supply terminal and the negative output node /Nout and is controlled by a bit of speed control signal 'spdcnt<i>'. Each of the variable resistor elements VR may be implemented by a PMOS transistor.

The swing level control unit 240 can be configured to control a swing level of the output signal pair 'out' and '/out' in response to the swing level control signal 'swacnt'. The swing level control signal 'swacnt' can be implemented by combining k signals. The swing level control unit 240 can include k current source elements CS<1:k>. Each of k/2 current source elements CS<1:k/2> can be provided between the first node N1 and a ground terminal and can be controlled by a bit of swing level control signal 'swacnt<i>'. Each of k/2 current source elements CS<k/2+1:k> can be provided between the second node N2 and the ground terminal and can be controlled by a bit of swing level control signal 'swacnt<i>'. Each of the current source elements CS can be implemented by an NMOS transistor.

The sizes of the first transistor TR1 of the first signal processing unit 210 and the third transistor TR3 of the second signal processing unit 220 can be controlled such that the first transistor TR1 and the third transistor TR3 have different resistance values, respectively. Further, the sizes of the second transistor TR2 and the fourth transistor TR4 can be controlled such that the second transistor TR2 and the fourth transistor T4 have different resistance values, respectively. Accordingly, in each of the case where a signal that has a value of '1' is transmitted through the positive first signal line line1 and a signal that has a value of '0' is transmitted through the positive second signal line line2 and the case where a signal that has a value of '0' is transmitted through the positive first signal line line1 and a signal that has a value of '1' is transmitted through the positive second signal line line2, an output signal 'out' that has a different voltage level is generated at the positive output node Nout.

If both the positive first signal line line1 and the positive second signal line line2 transmit a signal that has a value of '0', then the positive output signal 'out' that has the highest voltage level can be generated at the positive output node Nout. If both the positive first signal line line1 and the positive second signal line line2 transmit a signal that has a value of '1', then the positive output signal 'out' that has the lowest voltage level can be generated at the positive output node Nout. In the same method, the negative output signal /Nout, which has a voltage level opposite to the voltage level of the positive output signal Nout, can be generated at the negative output node /Nout.

In this way, when the first input signal pair 'in1' and '/in1' and the second input signal pair 'in2' and '/in2' are respectively transmitted through the first signal line pair line1 and /line1 and the second signal line pair line2 and /line2, the signal processing block 20 can output one of four pieces of information, which can be transmitted through one bit of the first input signal pair 'in1' and '/in1' and one bit of the second input signal pair 'in2' and '/in2', using one of four levels of one bit of the output signal pair 'out' and '/out'. Meanwhile, when the first input signal pair 'in1' and '/in1' is transmitted using only the first signal line pair line1 and /line1, the signal processing block 20 can perform a differential amplifying operation on one bit of the first input signal pair 'in1' and '/in1' and output one bit of the output signal pair 'out' and '/out'.

Meanwhile, if among m signals that are included in the speed control signals 'spdcnt<1:m>', the number of enabled signals is increased, then the number of the m variable resistor elements VR<1: m> to be turned on is increased. Thus, a voltage can be smoothly supplied to the output node pair Nout and /Nout, and the operation speed of the signal processing block 20 is increased. In this case, the m speed control signals 'spdcnt<1:m>' should be implemented as low enable signals.

In this manner, if among the k signals included in the swing level control signals 'swacnt<1: k>', the number of enabled signals is large, then the number of k current source elements CS<1:k> to be turned on is increased. Thus, a ground voltage VSS can be smoothly supplied to the output node pair Nout and /Nout, and a swing level of the output signal pair 'out' and '/out' is increased.

The structure of the control signal generating block 30 can be appropriately adjusted by performing various tests, thereby determining whether or not to enable the individual signals that are included in the m speed control signals 'spdcnt<1:m>' and the k swing level control signals 'swacnt<1: k>' performing the above-described function.

Figure 8:
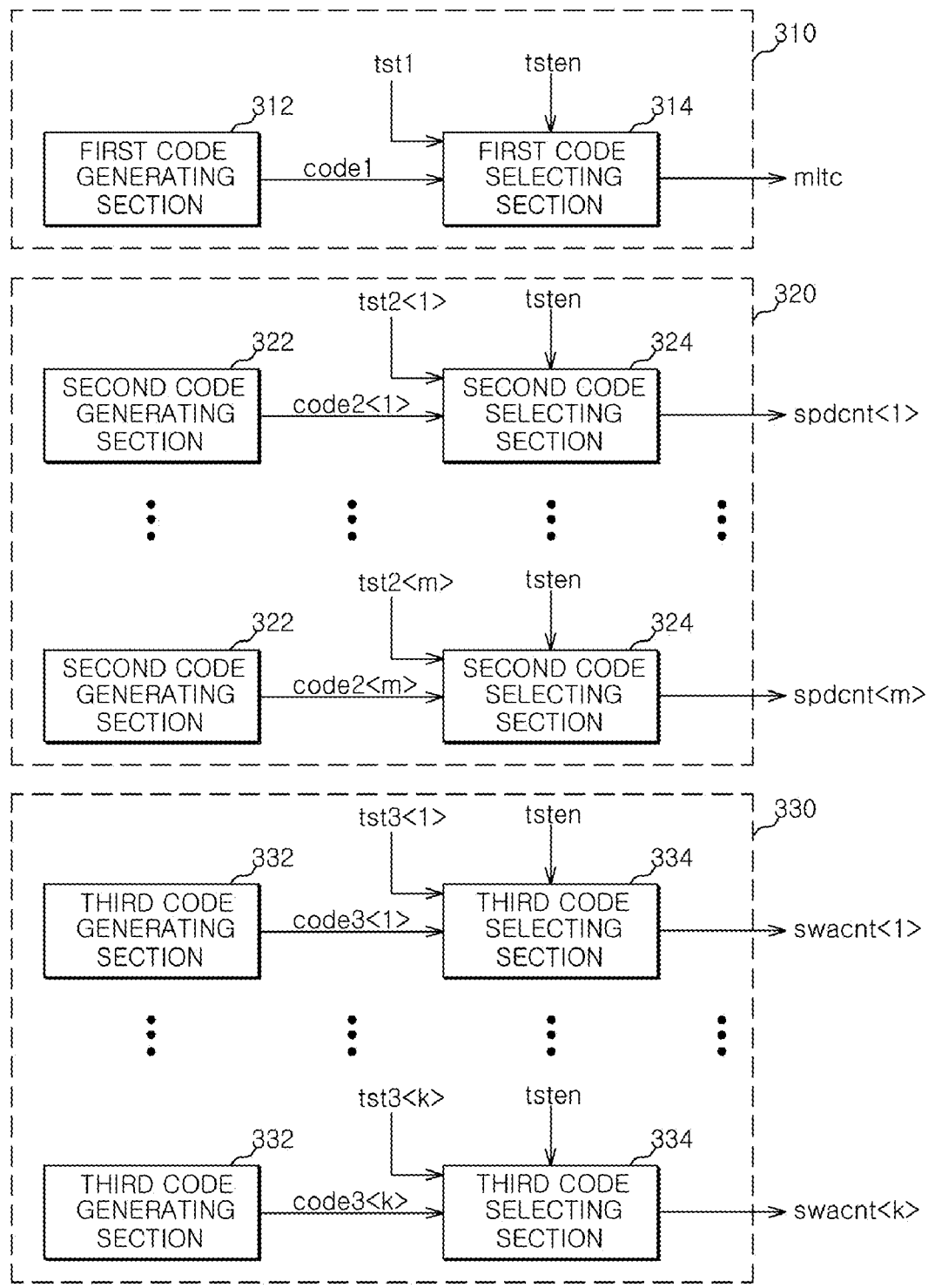
FIG. 8 is a diagram illustrating a detailed structure of a control signal generating block that can be included in the apparatus shown in FIG. 1.

Referring to FIG. 8, the control signal generating block 30 can include a multilevel transmission control signal generating unit 310, a speed control signal generating unit 320, and a swing level control signal generating unit 330.

The multilevel transmission control signal generating unit 310 can include a first code generating section 312 and a first selecting section 314.

The first code generating section 312 can include a fuse circuit or a register circuit and can be configured to generate a first code signal 'code1'. In response to a test enable signal 'tsten', the first selecting section 314 can be configured to selectively output the first code signal 'code1' or a first test signal 'tst1' as the multilevel transmission control signal 'mltc'.

The speed control signal generating unit 320 can include m second code generating sections 322 and m second selecting sections 324.

Each of the m second code generating sections 322 can include a fuse circuit or a register circuit and output each of m second code signals 'code2<1:m>'. In response to the test enable signal 'tsten', the m second selecting sections 324 can be configured to selectively output the m second code signals 'code2<1:m>'or the m second test signals 'tst2<1:m>' as the m speed control signals 'spdcnt<1: m>'.

The swing level control signal generating unit 330 can include k third code generating sections 332 and k third selecting sections 334.

Each of the k third code generating sections 332 can include a fuse circuit or a register circuit and can be configured to generate each bit of k third code signals 'code3<1:k>'. In response to the test enable signal 'tsten', the k third selecting sections 334 can be configured to selectively output the k third code signals 'code3<1:k>' or the k third test signals 'tst3<1:k>' as the k swing level control signals 'swacnt<1:k>'.

In the control signal generating block 30 that has the above-described structure, if a test operation is performed, then the test enable signal 'tsten' can be enabled. In this case, the first test signal 'tst1', the m second test signals 'tst2<1:m>', and the k third test signals 'tst3<1:k>' can be output as the multilevel transmission control signal 'mltc', the m speed control signals 'spdcnt<1:m>', and the k swing level control signals 'swacnt<1: k>' respectively.

Meanwhile, if a test operation is completed, then the test enable signal 'tsten' can be disabled. In this case, the first code signal 'code1', the m second code signals 'code2<1:m>', and the k third code signals 'code3<1:k>' can be output as the multilevel transmission control signal 'mltc', the m speed control signals 'spdcnt<1:m>', and the k swing level control signals 'swacnt<1: k>', respectively.

In this manner, the control signal generating block 30 can be controlled, and the multilevel transmission control signal 'mltc', the m speed control signals 'spdcnt1<1:m>', and the k swing level control signals 'swacnt<1: k>' can be generated. As a result, it is possible to control a whole operation of the signal transmitting apparatus. Accordingly, even in a mounting step of a semiconductor integrated circuit after a designing step, it is possible to control whether the signal transmitting apparatus performs a multilevel transmission operation, and the operation speed and swing level.

That is, the signal transmitting apparatus in a semiconductor integrated circuit can selectively perform a multilevel transmission operation according to the control of the multilevel transmission control signal. Further, the signal transmitting apparatus can control the operation speed according to the speed control signal, and control the swing level of the output signal according to the swing level control signal. As such, the signal transmitting apparatus selectively controls a function and efficiency of the operation. Therefore, the signal transmitting apparatus can appropriately select the operation speed and the amount of power consumed, and can easily adjust to the external conditions.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An apparatus for transmitting a signal in a semiconductor integrated circuit, the apparatus comprising:
    a multilevel transmission control block configured to output a plurality of bits of an input signal in serial or parallel according to whether a multilevel transmission operation is performed or not; and
    a signal processing block coupled with the multilevel transmission control block configured to selectively perform the multilevel transmission operation according to a form of the input signal, which is output in serial or parallel from the multilevel transmission control block;
    wherein the signal processing block is further configured to perform the multilevel transmission operation according to whether a multilevel transmission control signal is enabled or not, and when the multilevel transmission control signal is disabled, the multilevel transmission control block is further configured to only output signals to a first signal line, and when the multilevel transmission control signal is enabled, the multilevel transmission control block is further configured to output the signals to the first signal line and a second signal line.

2. The apparatus of claim 1, wherein the multilevel transmission control block includes:
    a multiplexer control unit configured to generate a plurality of bits of first and second multiplexer control signals in response to a clock and the multilevel transmission control signal;
    a signal distributing unit configured to latch the plurality of bits of the input signal in a bit unit and output a plurality of bits of first and second input signals;
    a first multiplexer unit configured to sequentially output the plurality of the first input signal to the first signal line in response to the first multiplexer control signal;
    a second multiplexer unit configured to sequentially output the plurality of the second input signal to the second signal line in response to the second multiplexer control signal; and
    a switching unit configured to determine whether or not to connect the first signal line and the second signal line and whether not to short-circuit the second signal line, in accordance with the control of the multilevel transmission control signal.

3. The apparatus of claim 1, wherein the signal processing block is configured to drive individual bits of the signals, and store two pieces of information for each bit, thereby outputting the signals when the signals are transmitted only through the first signal line, and
    wherein the signal processing block is configured to drive individual bits of the signals, and store four pieces of information for each bit, thereby outputting the signals when the signals are transmitted through both the first signal line and the second signal line.

4. The apparatus of claim 3, wherein the signal processing block is configured to control an operation speed in response to a speed control signal, and control a swing level of output signal in response to a swing level control signal.

5. The apparatus of claim 4, wherein the signal processing block includes:
    a first signal processing unit configured to control voltages at an output node according to the signals input through the first signal line;
    a second signal processing unit configured to control the voltages at the output node according to the signals input through the second signal line;
    a speed control unit configured to control an output speed of an output signal output from the output node according to the control of the speed control signal; and
    a swing level control unit configured to control a swing level of the output signal according to the control of the swing level control signal.

6. The apparatus of claim 4, further comprising a control signal generating block configured to generate the multilevel transmission control signal, the speed control signal, and the swing level control signal.

7. The apparatus of claim 6, wherein the control signal generating block includes:
    a multilevel transmission control signal generating unit configured to include a fuse circuit or a register circuit, the multilevel transmission control signal generating unit configured to generate a first code signal, and selectively output the first code signal or a first test signal as the multilevel transmission control signal in response to a test enable signal;

a speed control signal generating unit that includes a fuse circuit or a register circuit, the speed control circuit configured to generate a second code signal, and to selectively output the second code signal or a second test signal as the speed control signal in response to the test enable signal; and a swing level control signal generating unit that includes a fuse circuit or a register circuit, the swing level control signal generating unit configured to generate a third code signal, and selectively outputs the third code signal or a third test signal as the swing level control signal in response to the test enable signal.

8. An apparatus for transmitting a signal in a semiconductor integrated circuit, the apparatus comprising:

a first signal line;

a second signal line;

an output node;

a multilevel transmission control block configured to output a plurality of bits of an input signal to the first signal line or the second signal line according to whether a multilevel transmission operation is performed or not;

a first signal processing unit configured to control a voltage at the output node according to a signal transmitted through the first signal line;

a second signal processing unit configured to control the voltage at the output node according to a signal transmitted through the second signal line; and a speed control unit configured to control an output speed of a signal output from the output node in response to a speed control signal;

wherein the multilevel transmission operation is determined according to whether a multilevel transmission control signal is enabled or not, and when the multilevel transmission control signal is disabled, the multilevel transmission control block is further configured to output signals to the first signal line, and when the multilevel transmission control signal is enabled, the multilevel transmission control block is further configured to output the signals to both the first signal line and the second signal line.

9. The apparatus of claim 8, wherein the multilevel transmission control block includes:

a multiplexer control unit configured to generate a plurality of bits of first and second multiplexer control signals in response to a clock and the multilevel transmission control signal;

a signal distributing unit configured to latch the plurality of bits of the input signal in a bit unit and output a plurality of bits of first and second input signals;

a first multiplexer unit configured to sequentially output the first input signal to the first signal line in response to the first multiplexer control signal;

a second multiplexer unit configured to sequentially output the second input signal to the second signal line in response to the second multiplexer control signal; and a switching unit configured to determine whether or not to connect the first signal line and the second signal line and whether or not to short-circuit the second signal line, in accordance with the control of the multilevel transmission control signal.

10. The apparatus of claim 9, wherein, when the multilevel transmission control signal is disabled, the multiplexer control unit is configured to sequentially enable the first multiplexer control signal in a bit unit in synchronization with the clock and then sequentially enable the second multiplexer control signal in a bit unit, and when the multilevel transmission control signal is enabled, the multiplexer control unit is configured to alternately enable the first multiplexer control signal and the second multiplexer control signal in a bit unit in synchronization with the clock.

11. The apparatus of claim 10, wherein the multiplexer control unit includes:

a shifting section configured to generate a plurality of bits of a shift signal in response to the multilevel transmission control signal, the clock, and a reset signal; and a signal output section configured to output the first multiplexer control signal and the second multiplexer control signal from the plurality of bits of the shift signal in response to the multilevel transmission control signal.

12. The apparatus of claim 9, wherein the first multiplexer unit is configured to sequentially output the plurality of the first input signal to the first signal line in response to the first multiplexer control signal, and the second multiplexer unit is configured to sequentially output the plurality of the second input signal to the second signal line in response to the second multiplexer control signal.

13. The apparatus of claim 9, wherein, when the multilevel transmission control signal is disabled, the switching unit is configured to connect the first signal line and the second signal line, and stop the connection between the second signal line and the second signal processing unit, and when the multilevel transmission control signal is enabled, the switching unit is configured to stop the connection between the first signal line and the second signal line, and connect the second signal line to the second signal processing unit.

14. The apparatus of claim 8, wherein, when the signal is transmitted through the second signal line, the second signal processing unit is activated, and is configured to store four pieces of information for each bit of the signal output from the output node, and outputs the signal.

15. The apparatus of claim 8, further comprising a swing level control unit configured to control a swing level of the signal output from the output node in response to a swing level control signal.

16. The apparatus of claim 15, further comprising a control signal generating block configured to generate the multilevel transmission control signal, the speed control signal, and the swing level control signal.

17. The apparatus of claim 16, wherein the control signal generating block includes:

a multilevel transmission control signal generating unit that includes a fuse circuit or a register circuit and is configured to generate a first code signal, and selectively output the first code signal or a first test signal as the multilevel transmission control signal in response to a test enable signal;

a speed control signal generating unit that includes a fuse circuit or a register circuit and is configured to generate a second code signal, and selectively output the second code signal or a second test signal as the speed control signal in response to the test enable signal; and a swing level control signal generating unit that includes a fuse circuit or a register circuit and is configured to generate a third code signal, and selectively output the third code signal or a third test signal as the swing level control signal in response to the test enable signal.

18. An apparatus for transmitting a signal in a semiconductor integrated circuit, the apparatus comprising:

a control signal generating block configured to generate a speed control signal and a swing level control signal;

a signal processing unit configured to control voltage levels of an output signal according to an input signal;

a speed control unit configured to control an output speed of the output signal in response to the speed control signal; and a swing level control unit configured to control a swing level of the output signal in response to the swing level control signal;

wherein, when signals are transmitted only through a first signal line, the signal processing unit is configured to drive individual bits of the signals, store two pieces of information for each bit, and output the signals, and when the signals are transmitted through both the first signal line and a second signal line, the signal processing unit is configured to drive individual bits of the signals, store four pieces of information for each bit, and output the signals.

19. The apparatus of claim 18, wherein the control signal generating block is configured to generate a multilevel transmission control signal.

20. The apparatus of claim 19, wherein the control signal generating block includes:

a multilevel transmission control signal generating unit that includes a fuse circuit or a register circuit and is configured to generate a first code signal, and selectively output the first code signal or a first test signal as the multilevel transmission control signal in response to a test enable signal;

a speed control signal generating unit that includes a fuse circuit or a register circuit and is configured to generate a second code signal, and selectively output the second code signal or a second test signal as the speed control signal in response to the test enable signal; and a swing level control signal generating unit that includes a fuse circuit or a register circuit and is configured to generate a third code signal, and selectively output the third code signal or a third test signal as the swing level control signal in response to the test enable signal.

21. The apparatus of claim 19, further comprising a multilevel transmission control block configured to output a plurality of bits of an input signal to the first signal line or both the first signal line and the second signal line in response to the multilevel transmission control signal.

22. The apparatus of claim 21, wherein the multilevel transmission control block includes:

a multiplexer control unit configured to generate a plurality of bits of first and second multiplexer control signals in response to a clock and the multilevel transmission control signal;

a signal distributing unit configured to latch the plurality of bits of the input signal in a bit unit and outputs a plurality of bits of first and second input signals;

a first multiplexer unit configured to sequentially output the first input signal to the first signal line in response to the first multiplexer control signal;

a second multiplexer unit configured to sequentially output the second input signal to the second signal line in response to the second multiplexer control signal; and a switching unit configured to determine whether or not to connect the first signal line and the second signal line and whether or not to short-circuit the second signal line, in accordance with the control of the multilevel transmission control signal.

* * * * *